United States Patent [19]  [11] Patent Number: 4,954,588
Oka et al.  [45] Date of Patent: Sep. 4, 1990

[54] FLUORINE-CONTAINING NON-CRYSTALLINE COPOLYMER

[75] Inventors: Masahiko Oka, Ohtsu; Hiroshi Uemoto; Yasuji Iwasaki, both of Settsu, all of Japan

[73] Assignee: Daikin Industries Ltd., Osaka, Japan

[21] Appl. No.: 403,867

[22] Filed: Sep. 7, 1989

[30] Foreign Application Priority Data

Sep. 10, 1988 [JP] Japan .................. 63-227185
Oct. 31, 1988 [JP] Japan .................. 63-275276
Mar. 7, 1989 [JP] Japan .................. 1-54475

[51] Int. Cl.$^5$ .................................... C08F 16/24
[52] U.S. Cl. .................................... 526/247
[58] Field of Search .......................... 526/247

[56] References Cited

U.S. PATENT DOCUMENTS

| | | | |
|---|---|---|---|
| 2,975,161 | 3/1961 | Abramo et al. | 526/247 |
| 2,975,164 | 3/1961 | Crawford et al. | |
| 2,991,278 | 7/1961 | Schildknecht | 526/247 |
| 3,480,605 | 11/1969 | Pittman et al. | 526/247 |
| 3,855,191 | 12/1974 | Doughty, Jr. et al. | 526/247 |
| 4,418,186 | 11/1983 | Yamabe et al. | 526/247 |
| 4,499,249 | 2/1985 | Nakagawa et al. | 526/247 |
| 4,743,658 | 5/1988 | Imbalzano et al. | 526/247 |
| 4,766,190 | 8/1988 | Morita et al. | 526/247 |

FOREIGN PATENT DOCUMENTS

| | | | |
|---|---|---|---|
| 0224037 | 6/1987 | European Pat. Off. | 526/247 |
| 61-223007 | 10/1986 | Japan | 526/247 |
| 63-289008 | 11/1988 | Japan | 526/247 |
| 739731 | 5/1953 | United Kingdom . | |
| 742083 | 12/1955 | United Kingdom | 526/247 |

*Primary Examiner*—Joseph L. Schofer
*Assistant Examiner*—N. Sarofim
*Attorney, Agent, or Firm*—Birch, Stewart, Kolasch & Birch

[57] ABSTRACT

A fluorine-containing non-crystalline copolymer comprising 10 to 90% by mole of repeating units derived from tetrafluoroethylene and 90 to 10% by mole of repeating units derived form a fluorovinyl ether of the formula:

$$CH_2=CHOCH_2(CF_2)_nX \qquad (I)$$

wherein X is a halogen atom or a hydrogen atom and n is a number of 2 to 8, and a copolymer comprising repeating units derived from tetrafluoroethylene, the fluorovinyl ether (I) and a third monomer selected from the group consisting of vinylidene fluoride and ethylene in which the content of repeating units derived from the third monomer is from 1 to 80% by mole in case of vinylidene fluoride or from 10 to 60% by mole in case of ethylene, and the reminder consists of the repeating units derived form tetrafluoroethylene and the fluorovinyl ether (I) in a molar ratio of 1:9 to 9:1, which have good low temperature properties as well as resistance to heat, oil and chemicals.

7 Claims, No Drawings

FLUORINE-CONTAINING NON-CRYSTALLINE COPOLYMER

BACKGROUND OF THE INVENTION

1. Field of the Invention

The present invention relates to a novel fluorine-containing non-crystalline copolymer with good oil resistance, heat resistance and low temperature properties, and more particularly, the present invention relates to a novel fluorine-containing non-crystalline copolymer comprising repeating units derived from tetrafluoroethylene and a fluorovinyl ether of the formula:

$$CH_2=CHOCH_2(CF_2)_nX \qquad (I)$$

wherein X is halogen or hydrogen and n is a number of 2 to 8 and optionally repeating units derived from vinylidene fluoride or ethylene.

2. Description of the Related Art

Hitherto, a copolymer of vinylidene fluoride and hexafluoropropylene and a terpolymer of vinylidene fluoride, hexafluoropropylene and tetrafluoroethylene are used in various fields in the form of a packing, diaphragm or hose since they are fluoroelastomers with good heat resistance, oil resistance and chemical resistance.

When these copolymers are used in applications where they contact with alkalis or amines, or motor oils, they are attacked by such chemicals and become brittle and sometimes lose their functions as a rubber.

As a fluorine-containing elastic copolymer which has good resistance to the alkalis, amines and various oils, a copolymer of tetrafluoroethylene and perfluoro(vinyl ether), a copolymer of ethylene and perfluoro(vinyl ether) and a terpolymer of tetrafluoroethylene, ethylene and perfluoro(vinyl ether) (cf. Japanese Patent Kokai Publication No. 15212/1987) or a copolymer of tetrafluoroethylene and propylene are proposed. However, a copolymer comprising perfluoro(vinyl ether) is an expensive elastomeric copolymer since the synthesis of perfluoro(vinyl ether) is complicated. Thus such as copolymer does not satisfy the requirements of the practical use.

The copolymer of tetrafluoroethylene and propylene has unsatisfactory oil resistance since it contains a comparatively large amount of propylene, and it loses flexibility at low temperatures so that it cannot be used in an application which requires prolonged durability at low temperatures.

SUMMARY OF THE INVENTION

One object of the present invention is to provide a fluorine-containing non-crystalline copolymer which is cheap and resistant to lubricant oils, particularly to motor oils.

Another object of the present invention is to provide a fluorine-containing non-crystalline copolymer which has good heat resistance and low temperature properties.

Accordingly, the present invention provides a fluorine-containing non-crystalline copolymer comprising 10 to 90% by mole, preferably 35 to 65% by mole of repeating units derived from tetrafluoroethylene and 90 to 10% by mole, preferably 65 to 35% by mole of repeating units derived from a fluorovinyl ether of the formula:

$$CH_2=CHOCH_2(CF_2)_nX \qquad (I)$$

wherein X is a halogen atom or a hydrogen atom and n is a number of 2 to 8, and a copolymer comprising repeating units derived from tetrafluoroethylene, the fluorovinyl ether (I) and a third monomer selected from the group consisting of vinylidene fluoride and ethylene in which the content of repeating units derived from the third monomer is from 1 to 80% by mole in case of vinylidene fluoride or from 10 to 60% by mole in case of ethylene, and the remainder consists of the repeating units derived from tetrafluoroethylene and the fluorovinyl ether (I) in a molar ratio of 1:9 to 9:1.

Through copolymerization of vinylidene fluoride or ethylene with tetrafluoroethylene and the fluorovinyl ether (I), the low temperature properties of the copolymer of tetrafluoroethylene and the fluorovinyl ether (I) can be further improved without deteriorating other properties.

DETAILED DESCRIPTION OF THE INVENTION

In the terpolymer of tetrafluoroethylene, the fluorovinyl ether (I) and vinylidene fluoride, preferably the contents of tetrafluoroethylene, the fluorovinyl ether and vinylidene fluoride are 15 to 50% by mole, 10 to 50% by mole and 5 to 60% by mole, respectively.

In the terpolymer of tetrafluoroethylene, the fluorovinyl ether (I) and ethylene, preferably the contents of tetrafluoroethylene, the fluorovinyl ether and ethylene are 10 to 50% by mole, 15 to 60% by mole and 10 to 50% by mole, respectively.

The fluorovinyl ether (I) to be used according to the present invention is a known compound from, for example, GB Patent No. 739,731, and can be easily prepared through an ester/ether interchange between acetic acid and a suitable fluoroalcohol. Examples of the fluoroalcohol are $H(CF_2)_2CH_2OH$, $H(CF_2)_4CH_2OH$, $H(CF_2)_8CH_2OH$, $CF_3CF_2CH_2OH$, $F(CF_2)_8CH_2OH$, $Cl(CF_2)_2CH_2OH$, $Cl(CF_2)_8CH_2OH$, etc.

In the formula (I), n is 2 to 8, preferably from 4 to 6. When n is smaller than 2, the low temperature properties of the copolymer tend to be deteriorated, while when n is larger than 8, a polymerization rate is decreased.

Preferred examples of the fluorovinyl ether (I) are $CH_2=CHOCH_2(CF_2)_2H$,
$CH_2=CHOCH_2(CF_2)_4H$,
$CH_2=CHOCH_2(CF_2)_6H$,
$CH_2=CHOCH_2(CF_2)_8H$,
$CH_2=CHOCH_2(CF_2)_2F$,
$CH_2=CHOCH_2(CF_2)_4F$,
$CH_2=CHOCH_2(CF_2)_6F$,
$CH_2=CHOCH_2(CF_2)_8F$,
$CH_2=CHOCH_2(CF_2)_2Cl$,
$CH_2=CHOCH_2(CF_2)_4Cl$,
$CH_2=CHOCH_2(CF_2)_6Cl$,
$CH_2=CHOCH_2(CF_2)_8Cl$.

The fluorovinyl ether (I) is the important monomer which imparts flexibility to the copolymer of the present invention. When the content of the fluorovinyl ether (I) is less than 10% by mole, the proportion of non-crystalline part in the copolymer is decreased so that the copolymer lacks flexibility. When the content of the fluorovinyl ether (I) is too large, the polymerization rate is decreased and the copolymer has such a small molecular weight that it cannot be practically used.

The copolymer of the present invention may contain at least one additional comonomer in addition to the above essential monomers. Examples of the optionally copolymerized monomer are CF$_2$=CFCl,
CF$_2$=CFCF$_3$,
CH$_2$=CXR$_f$,
CF$_2$=CFO(CF$_2$CF$_2$)$_m$CH$_2$I,
CF$_2$=CFO(CF$_2$)$_m$CN,
CF$_2$=CFO(CF$_2$)$_m$Br,
CF$_2$=CFO(CF$_2$)$_m$I,
CH$_2$=CHOR$^1$,
CH$_2$=CHOCH$_2$CH$_2$Cl,
CF$_2$=CFCF$_2$COOH,

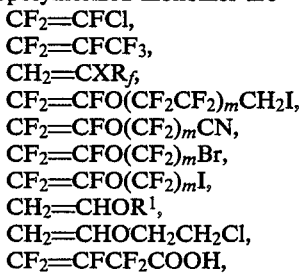

wherein X is a hydrogen atom or a fluorine atom, R$_f$ is a fluoroalkyl group having 1 to 12 carbon atoms, R$^1$ is an alkyl group having 1 to 12 carbon atoms, and m is an integer of 1 to 8,

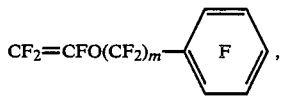

wherein A$^1$ is a group of the formula: —CF(CF$_3$)—CF$_2$O—, A$^2$ is a group of the formula: —CF$_2$CF$_2$CF$_2$O— or —CH$_2$CF$_2$CF$_2$O—, A$^3$ is a group formula: —(CF$_2$)$_2$CH$_2$X$^1$ in which X$^1$ is a halogen atom or a perfluoroalkyl group having 1 to 5 carbon atoms, p and q are positive numbers which satisfy: 1≦p+q≦5.

The amount of the optionally copolymerizable monomer is less than 30% by mole based on the whole weight of the copolymer.

In general, the non-crystalline copolymer of the present invention has an intrinsic viscosity of 0.01 to 10.00, a number average molecular weight of 1000 to 1,000,000, preferably 10,000 to 500,000.

The copolymer of the present invention may be prepared by any of the conventional polymerization processes, for example, emulsion polymerization, suspension polymerization, bulk polymerization, etc. The monomers can be supplied batchwise or continuously while keeping the monomer composition in the reaction system constant.

The polymerization radically proceeds by the use of any of the polymerization initiators which are used to initiate the conventional fluorine-containing olefins. Examples of the polymerization initiator are inorganic peroxides such as a persulfate (e.g. ammonium persulfate) or a redox system, namely a combination of a persulfate with a reducing agent (for example, sodium sulfite and acidic sodium sulfite) and optionally an accelerator (for example, ferrous sulfate, copper sulfate, silver nitrate, etc.); organic peroxides (e.g. diisopropyl peroxydicarbonate, isobutyryl peroxide, benzoyl peroxide, acetyl peroxide, tert.-butyl hydroperoxide, etc.); fluorine-containing peroxides (e.g. [Cl(CF$_2$CFCl)$_2$CF$_2$COO—]$_2$, [H(CF$_2$CF$_2$)$_3$COO—]$_2$, (ClCF$_2$CF$_2$COO—)$_2$, [CH$_3$—C(CH$_3$)$_2$—OCH$_2$CF$_2$COO—]$_2$ etc.); and the like.

In case of emulsion polymerization, as the emulsifier, preferably, an alkali metal salt or an ammonium salt of a compound of the formula:

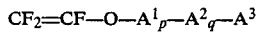  (II)

wherein Y is a hydrogen atom or a fluorine atom, Z is —COOH or —SO$_3$H and m is a number of 5 to 12 is used in a concentration of 0.1 to 5% by weight, preferably 0.5 to 2% by weight based on the weight of water.

In the suspension polymerization, water is usually used as a polymerization medium, although the polymerization medium may contain a fluorohydrocarbon such as 1,1,2-trichloro-1,2,2-trifluoroethane, 1,2-dichloro-1,1,2,2-tetrafluoroethane, perfluorocyclobutane, dichlorodifluoromethane, trichlorofluoromethane, etc.

The polymerization temperature varies with the decomposition rate of polymerization initiator, and is usually from 0° to 150° C.

The polymerization pressure depends on other polymerization conditions such as the polymerization temperature or polymerization mode and is usually from 0 to 50 kg/cm$^2$G.

Although the molecular weight of the copolymer may be controlled by adjusting the relationship between the polymerization rate and the amount of the polymerization initiator, it is preferably controlled with the addition of a chain transfer agent. Preferred examples of the chain transfer agent are hydrocarbons having 4 to 6 carbon atoms, alcohols, ethers, organic halogenides (e.g. CCl$_4$, CBrCl$_3$, CF$_2$BrCFBrCF$_3$, CF$_2$I$_2$, etc.).

The non-crystalline copolymer of the present invention can be cross linked in the presence of a crosslinking source. Examples of the cross-linking source are radioactive rays (e.g. alpha rays, beta rays, gamma rays, electron beams, X rays, etc.), high energy electromagnetic waves (e.g. ultraviolet light), organic peroxides, and the like. Among them, the organic peroxides are preferably used in an mount of 0.05 to 10 parts by weight, preferably 1 to 5 parts by weight based on 100 parts by weight of the copolymer.

As the organic peroxide, a compound which easily generates a peroxy radical in the presence of heat or a redox system. Preferred examples of the organic peroxide to be used as the cross linking agent are 1,1-bis(tert.-butylperoxy)-3,5,5-trimethylcyclohexane, 2,5-dimethylhexane-2,5-dihydroperoxide, di-tert.-butyl peroxide, tert.-butylcumyl peroxide, dicumyl peroxide, α,α'-bis(-tert.-butylperoxy)-p-diisopropylbenzene, 2,5-dimethyl-2,5-di(tert.-butylperoxy)-hexane, 2,5-dimethyl-2,5-di(-tert.-butylperoxy)-hexine-3, benzoyl peroxide, tert.-butylperoxybenzene, 2,5-dimethyl-2,5-di(benzoylperoxy)hexane, tert.-butylperoxymaleic acid, tert.-butyl peroxyisopropylcarbonate, and the like. Among these, diaryl types are preferred. The type and amount of the peroxide are selected according to the content of —O—O—, the decomposition temperature, etc.

When the organic peroxide is used as the cross linking agent, a cross linking aid or co-cross linking agent may be used to improve the cross linking performances. As the cross linking aid or co-cross linking agent, any compound having a reactivity with the peroxy radicals and the polymer radicals may be used. Preferred examples of such compound are triallyl cyanurate, triallyl isocyanurate, triallyl formal, triallyl trimellitate, N,N'-m-phenylenebismaleimide, dipropargyl terephthalate, diallyl phthalate, tetraallyl terephthalamide, triallyl phosphate and the like.

The amount of the cross linking aid or co-cross linking agent is from 0.1 to 10 parts by weight, preferably from 0.5 to 5 parts by weight based on 100 parts by weight of the copolymer.

Alternatively, the copolymer comprising vinylidene fluoride can be cross linked with a polyamine, a polyol or a polythiol which is used to cross link conventional fluororubbers.

Together with the copolymer of the present invention, various polymers may be blended and co-cross linked. Examples of polymers to be blended and co-cross linked with the copolymer of the present invention are silicone oils, silicone rubbers, ethylene/vinyl acetate copolymers, polybutadiene, fluorosilicone oils, fluorosilicone rubbers, fluorophosphazene rubbers, hexafluoropropylene/ethylene copolymers, tetrafluoroethylene/propylene copolymers, and other polymers having radical reactivity. The amount of the blended copolymer is not critical but must not be so large as to deteriorate the properties of the copolymer of the present invention.

To the copolymer of the present invention, any conventional pigment, filler or reinforcing material may be added. Examples of the filler or reinforcing material are inorganic fillers (e.g. carbon black, $TiO_2$, $SiO_2$, clay, talc, etc.) and organic fillers such as fluorine-containing copolymers (e.g. polytetrafluoroethylene, polyvinylidene fluoride, polyvinyl fluoride, polychlorotrifluoroethylene, tetrafluoroethylene/ethylene copolymer, tetrafluoroethylene/vinylidene fluoride copolymer, vinylidene fluoride/hexafluoropropylene copolymer, tetrafluoroethylene/vinylidene fluoride/hexafluoropropylene copolymer, etc.).

The additives including the cross linking agent may be compounded with the copolymer of the present invention by any of suitable methods depending on the viscoelasticity and other properties of the materials. In case of the solid additives, they can be compounded with an open roll mill, a powder mixer, etc. In case of the liquid additives, a conventional mixer may be used. Alternatively, the solid materials may be dissolved or dispersed in a liquid medium and then compounded with the copolymer.

The cross linking temperature and time depend on the kind of peroxide to be used as the cross linking agent. In general, press curing is carried out at a temperature of 120° to 200° C. for 5 to 30 minutes, and oven curing is carried out at a temperature of 150° to 250° C. for 1 to 24 hours. Before the copolymer of the present invention is cross linked, it is preferably preheated at a temperature of 150° to 250° C. in the air, whereby the cross linking degree is increased.

The fluorine-containing non-crystalline copolymer of the present invention is molded in the form of an oil seal, a fuel hose, an O-ring or other gasket seal by utilizing good heat resistance, oil resistance and solvent resistance.

PREFERRED EMBODIMENTS OF THE INVENTION

The present invention will be illustrated by following examples, in which parts are by weight unless otherwise indicated.

EXAMPLE 1

In a 500 ml stainless steel made autoclave, ion-exchanged water (170 ml), ammonium perfluorooctanoate (0.34 g), disodium hydrogen phosphate.dodecahydrate (0.85 g) and sodium sulfite (0.17 g) were charged. After closing the lid of autoclave and replacing the interior atmosphere with nitrogen three times, the autoclave interior space was evacuated. Then, the fluoroalkyl vinyl ether of the formula: $CH_2=CHOCH_2(CF_2)_2H$ (7.54 g) was added to the mixture, and the autoclave was pressurized with tetrafluoroethylene gas to 10 kg/cm$^2$G at 30° C. while stirring. A 1.6 wt % solution of ammonium persulfate in water (5 g) was injected to initiate polymerization. Immediately, the pressure began to drop. When the pressure dropped to 9 kg/cm$^2$G, the pressure was recovered to 10 kg/cm$^2$G with tetrafluoroethylene. Then, the fluoroalkyl vinyl ether (2.51 g) was again added. The polymerization was continued for 141 minutes while adding the monomers when the pressure dropped. Thereafter, the polymerization was terminated by discharging the gas in the autoclave and quenching. A white aqueous dispersion was obtained.

The white aqueous dispersion was coagulated with potash alum, and the coagulated material was washed with water and dried to obtain a white rubbery copolymer (35.74 g). According to $^{19}$F-NMR analysis, the molar ratio of tetrafluoroethylene to the fluoroalkyl vinyl ether was 47:53. The intrinsic viscosity [$\eta$] of the copolymer in tetrahydrofuran at 35° C. was 0.93. The glass transition temperature ($T_g$) of the copolymer measured at a heating rate of 10° C./min. was +11° C. (the peak center temperature).

EXAMPLE 2

In a 300 ml stainless steel made autoclave, ion-exchanged water (100 ml), ammonium perfluorooctanoate (0.5 g), sodium carbonate (0.35 g), isopropanol (0.4 ml) and sodium sulfite (0.34 g) were charged. After closing the lid of autoclave and replacing the interior atmosphere with nitrogen three times, the autoclave interior space was evacuated. Then, the fluoroalkyl vinyl ether of the formula: $CH_2=CHOCH_2(CF_2)_2F$ (15.01 g) was added to the mixture, and the autoclave was pressurized with tetrafluoroethylene gas to 10.5 kg/cm$^2$G at 30° C. while stirring. A 2.51 wt % solution of ammonium persulfate in water (3 g) was injected to initiate polymerization. Immediately, the pressure began to drop. When the pressure dropped to 9.5 kg/cm$^2$G, the pressure was recovered to 10.5 kg/cm$^2$G with tetrafluoroethylene. The polymerization was continued for 96 minutes while adding tetrafluoroethylene when the pressure dropped. Thereafter, the polymerization was terminated by discharging the gas in the autoclave and quenching. A white aqueous dispersion was obtained.

The white aqueous dispersion was coagulated with potash alum, and the coagulated material was washed with water and dried to obtain a white rubbery copolymer (15.01 g). According to $^{19}$F-NMR analysis, the molar ratio of tetrafluoroethylene to the fluoroalkyl vinyl ether was 50:50. $T_g$ was +4° C.

EXAMPLE 3

In a 3.0 l stainless steel made autoclave, ion-exchanged water (1.0 l), ammonium perfluorooctanoate (2.0 g), disodium hydrogen phosphate.dodecahydrate (5.0 g) and sodium sulfite (4.0 g) were charged. After closing the lid of autoclave and replacing the interior atmosphere with nitrogen three times, the autoclave interior space was evacuated. Then, the fluoroalkyl vinyl ether of the formula: $CH_2=CHOCH_2(CF_2)_4H$ (50 g) was added to the mixture, and the autoclave was pressurized with tetrafluoroethylene gas to 10 kg/cm$^2$G at 15° C. while stirring. A 10 wt % solution of ammonium persulfate in water (5.0 g) was injected to initiate polymerization. Immediately, the pressure began to drop. When the pressure dropped to 9 kg/cm²G, the pressure was recovered to 10 kg/cm²G with tetrafluoroethylene. Then, the fluoroalkyl vinyl ether (25 g) was again added. The polymerization was continued for 4 hours and 5 minutes while adding the monomers when the pressure dropped. Thereafter, the polymerization was terminated by discharging the gas in the autoclave and quenching. A white aqueous dispersion was obtained.

The white aqueous dispersion of the solid content of 28.3% was coagulated with potash alum, and the coagulated material was washed with water and dried to obtain a white copolymer (370 g). According to $^{19}$F-NMR analysis, the molar ratio of tetrafluoroethylene to the fluoroalkyl vinyl ether was 52:48. The intrinsic viscosity [η] was 2.41, and $T_g$ was −10° C.

EXAMPLES 4 AND 5

In the same manner as in Example 3 but employing the conditions specified in Table 1, the polymerization was carried out to obtain a copolymer. The monomer composition and properties of the copolymer are shown in Table 1.

TABLE 1

| Example No. | 4 | 5 |
|---|---|---|
| Initial charge | | |
| Ion-exchanged water (l) | 1.0 | 1.0 |
| Ammonium perfluorooctanoate (g) | 2.0 | 2.0 |
| Disodium hydrogen phosphate (g) | 5.0 | 5.0 |
| Sodium sulfite (g) | 1.0 | 2.0 |
| Ammonium persulfate (g) | 1.0 | 2.0 |
| 8FVE (g) | 350 | 16.0 |
| Additional monomer | | |
| CH$_2$ = CHOCH$_2$(CF$_2$)$_4$H (8FVE) (g) | 0 | 8.0 |
| Reaction temperature (°C.) | 30 | 15 |
| Reaction pressure (kg/cm²G) | 10 | 10 |
| Reaction time (minutes) | 100 | 102 |
| Solid content of dispersion (%) | 3.0 | 19.2 |
| Molar ratio of monomers (TFE*¹/8FVE) | 39/61 | 59/41 |
| Tg (°C.) | −18 | −10 |

Note:
*¹TFE: Tetrafluoroethylene.

EXPERIMENT EXAMPLE 1

The copolymer prepared in Example 3 (100 parts), magnesium oxide (30 parts), triallyl isocyanurate (hereinafter referred to as "TAIC") (30 parts) and benzoylperoxide (3.5 parts) were compounded and press cured at 130° C. under pressure of 35 kgf/cm² for 10 minutes to prepare a molded sheet. Then, resistance to amine and oil and aging in the air were examined with the prepared sheet.

For comparison, DAI-EL (a trade name of Daikin) G-902 (vinylidene fluoride/tetrafluoroethylene/hexafluoropropylene terpolymer) (100 parts), medium thermal carbon (20 parts), TAIC (4 parts) and 2,5-dimethyl-2,5-di(tert.-butylperoxy)hexane (1.5 parts) were compounded, press cured at 160° C. under pressure of 35 kgf/cm² for 10 minutes and then oven curled at 180° C. for 4 hours to obtain a molded sheet, which were subjected to the same test as above.

The results are shown in following Tables.

| Original state properties | Example 3 | DAI-EL G-902 |
|---|---|---|
| 100% Tensile modulus (M$_{100}$) | 65 kgf/cm² | 26 kgf/cm² |
| Tensile strength at break (T$_b$) | 156 kgf/cm² | 201 kgf/cm² |
| Elongation at break (E$_b$) | 225% | 330% |
| Hardness (JIS, H$_s$) (points) | 70 | 65 |

| | Resistance to amines | | | |
|---|---|---|---|---|
| | Example 3 | | DAI-EL G-902 | |
| Amine (Dip conditions) | Volume change | Appearance | Volume change | Appearance |
| Ethylene diamine (30° C. × 30 min.) | 8.5% | No change | 6.0% | Cracks at folding |
| DBU*¹ (30° C. × 2 hrs.) | 4.8% | No change | 2.6% | Cracks at folding |

Note:
*¹DBU = 1,8-diazabicyclo[5.4.0]undecene-7.

| Oil resistance (dip condition: 175° C. × 70 hours) | Example 3 | DAI-EL G-902 |
|---|---|---|
| ASTM No. 3 oil | | |
| ΔV (%) | +2.9 | +2.0 |
| Toyota SF class*¹ motor oil | | |
| ΔT$_b$ (%) | +7 | −41 |
| ΔE$_b$ (%) | +24 | −33 |
| ΔH$_s$ (points) | −2 | +1 |
| ΔV (%) | +1.2 | +0.9 |
| Appearance | No change | Cracked |

Note:
*¹"Clean Excellent" 10W-40.
ΔT$_b$: Change of tensile strength at break.
ΔE$_b$: Change of elongation at break.
ΔH$_s$: Change of hardness.
ΔV: Change of volume.

| | Aging in the air | | | |
|---|---|---|---|---|
| | Example 3 | | DAI-EL G-902 | |
| Exposure temp. (°C.) | 200 | 230 | 200 | 230 |
| Exposure time (hrs.) | 70 | 70 | 70 | 70 |
| ΔT$_b$ (%) | +6 | −15 | +8 | −2 |
| ΔE$_b$ (%) | −11 | −25 | +6 | +6 |
| ΔH$_2$ (points) | 0 | +3 | 0 | 0 |

EXAMPLE 6

In a 200 ml stainless steel made autoclave the fluoroalkyl vinyl ether of the formula: CH$_2$=CHOCH$_2$(CF$_2$)$_6$H (49.9 g) was charged. After cooling it on a dry-ice/acetone bath, a solution of 2,4,5-trichloro-pefluorohexanoyl peroxide in 1,1,2-trichloro-1,2,2-trifluoroethane (hereinafter referred to as "R-113") a concentration of which was g/ml (1.5 ml) was added to the autoclave followed by replacement with nitrogen. Then, tetrafluoroethylene (50.6 g) was added to the mixture, and the monomers were reacted at 20° C. for 100 minutes while shaking followed by discharging the unreacted monomers and removing the solvent and the monomers by heating and evacuation to obtain a non-crystalline copolymer (12.6 g). According to $^{19}$F-NMR analysis, the molar ratio of tetrafluoroethylene to the fluoroalkyl vinyl ether was 47:53. T$_g$ was −19° C.

EXAMPLE 7

In a 3.0 l stainless steel made autoclave, ion-exchanged water (1.0 l), ammonium perfluorooctanoate (2.0 g), disodium hydrogen phosphate.dodecahydrate (5.0 g) and sodium sulfite (1.0 g) were charged. After closing the lid of autoclave and replacing the interior atmosphere with nitrogen three times, the autoclave interior space was evacuated. Then, the fluoroalkyl vinyl ether of the formula: $CH_2=CHOCH_2(CF_2)_4H$ (40 g) was added to the mixture, and the autoclave was pressurized with a mixture of tetrafluoroethylene and vinylidene fluoride to 14 kg/cm$^2$G at 30° C. while stirring so as to keep the molar ratio of tetrafluoroethylene to vinylidene fluoride at 70:30. Then, a 10 wt % solution of ammonium persulfate in water (5.0 g) was injected to initiate polymerization. Immediately, the pressure began to drop. When the pressure dropped to 13 kg/cm$^2$G, the pressure was recovered to 14 kg/cm$^2$G with a mixture of tetrafluoroethylene and vinylidene fluoride of the molar ratio of 74:26. Then, the fluoroalkyl vinyl ether (20 g) was again added. The polymerization was continued for 55 minutes while adding the monomers when the pressure dropped. Thereafter, the polymerization was terminated by discharging the gas in the autoclave and quenching. A white aqueous dispersion having the solid content of 23.6% by weight (1320 g) was obtained.

The white aqueous dispersion was coagulated with potash alum, and the coagulated material was washed with water and dried to obtain a white copolymer (310 g). According to $^{19}$F-NMR and $^1$H-NMR analyses, the molar ratio of tetrafluoroethylene/vinylidene fluoride/the fluoroalkyl vinyl ether was 49:14:37. The intrinsic viscosity was 1.48, and $T_g$ was −11° C.

EXAMPLES 8-23

In the same manner as in Example 7 but employing the conditions specified in Table 2, the polymerization was carried out to obtain a copolymer. The monomer composition and properties of the copolymer are shown in Table 2.

TABLE 2

| Example No. | 7 | 8 | 9 | 10 | 11 | 12 | 13 | 14 | 15 |
|---|---|---|---|---|---|---|---|---|---|
| Initial charge | | | | | | | | | |
| Ion-exchanged water (l) | 1.0 | 1.0 | 1.0 | 1.0 | 1.0 | 1.0 | 1.0 | 1.0 | 1.0 |
| Ammonium Perfluorooctanoate (g) | 2.0 | 2.0 | 2.0 | 2.0 | 2.0 | 2.0 | 2.0 | 2.0 | 2.0 |
| Disodium hydrogen phosphate (g) | 5.0 | 5.0 | 5.0 | 5.0 | 5.0 | 5.0 | 5.0 | 5.0 | 5.0 |
| Sodium sulfite (g) | 1.0 | 1.0 | 1.0 | 1.0 | 1.0 | 1.0 | 1.0 | 1.0 | 4.0 |
| Ammonium persulfate (g) | 0.5 | 0.5 | 0.5 | 0.5 | 0.5 | 0.5 | 0.5 | 0.5 | 1.0 |
| $CH_2 = CHOCH_2(CF_2)_4H$ (8FVE) (g) | 40 | 50 | 40 | 25.6 | 30 | 10 | 26 | 20 | 10 |
| Monomer mixture in interior TFE/VdF*$^1$ (molar ratio) | 70/30 | 55/45 | 65/35 | 30/70 | 25/75 | 26/74 | 57/43 | 52/48 | 40/60 |
| Additional monomers | | | | | | | | | |
| 8FVE | 20 | 25 | 20 | 12.8 | 15 | 10 | 13 | 10 | 5 |
| TFE/VdF (molar ratio) | 74/26 | 56/44 | 56/44 | 30/70 | 25/75 | 23/77 | 51/49 | 52/48 | 50/50 |
| Reaction temperature (°C.) | 30 | 30 | 30 | 30 | 30 | 30 | 30 | 30 | 30 |
| Reaction pressure (kg/cm$^2$G) | 14-13 | 13-12 | 13-12 | 13-12 | 23-22 | 23-22 | 13-12 | 13-12 | 13-12 |
| Reaction time (minutes) | 55 | 86 | 69 | 253 | 103 | 69 | 103 | 59 | 47 |
| Solid content of dispersion (%) | 23.6 | 24.9 | 23.1 | 17.9 | 13.0 | 12.8 | 16.7 | 15.7 | 12.0 |
| Molar ratio of monomers (TFE/VdF/8FVE) | 49/14/37 | 45/6/49 | 47/10/43 | 35/28/37 | 34/32/34 | 49/36/15 | 42/24/34 | 46/27/27 | 38/47/15 |
| Intrinsic viscosity (THF, 35° C.) | 1.48 | 1.39 | 1.51 | 0.79 | 1.05 | 0.92 | 1.42 | 1.32 | 0.73 |
| $T_g$ (°C.) | −18 | −13 | −11 | −15 | −15 | −15 | −12 | −12 | −18 |

| Example No. | 16 | 17 | 18 | 19 | 20 | 21 | 22 | 23 | 24 |
|---|---|---|---|---|---|---|---|---|---|
| Initial charge | | | | | | | | | |
| Ion-exchanged water (l) | 1.0 | 1.0 | 1.0 | 1.0 | 1.0 | 1.0 | 1.0 | 1.0 | 15.0 |
| Ammonium Perfluorooctanoate (g) | 2.0 | 2.0 | 2.0 | 2.0 | 2.0 | 2.0 | 2.0 | 2.0 | 30.0 |
| Disodium hydrogen phosphate (g) | 5.0 | 5.0 | 5.0 | 5.0 | 5.0 | 5.0 | 5.0 | 5.0 | 75.0 |
| Sodium sulfite (g) | 4.0 | 4.0 | 4.0 | 2.0 | 4.0 | 4.0 | 4.0 | 4.0 | 60.0 |
| Ammonium persulfate (g) | 1.0 | 1.5 | 1.0 | 1.0 | 1.0 | 1.0 | 1.0 | 1.5 | 15.0 |
| $CH_2 = CHOCH_2(CF_2)_4H$ (8FVE) (g) | 14 | 10 | 14 | 10 | 18 | 10 | 18 | 18 | 200 |
| Monomer mixture in interior TFE/VdF*$^1$ (molar ratio) | 39/61 | 29/71 | 49/51 | 53/47 | 50/50 | 21/79 | 44/56 | 52/48 | 43/57 |
| Additional monomers | | | | | | | | | |
| 8FVE | 7 | 5 | 7 | 5 | 9 | 5 | 9 | 9 | 100 |
| TFE/VdF (molar ratio) | 50/50 | 39/61 | 56/44 | 56/44 | 58/42 | 29/71 | 54/46 | 53/47 | 55/45 |
| Reaction temperature (°C.) | 30 | 30 | 30 | 30 | 30 | 30 | 30 | 30 | 30 |
| Reaction pressure (kg/cm$^2$G) | 13-12 | 13-12 | 13-12 | 13-12 | 13-12 | 13-12 | 13-12 | 8-7 | 7.5-6.5 |
| Reaction time (minutes) | 59 | 59 | 46 | 39 | 60 | 70 | 74 | 144 | 182 |
| Solid content of dispersion (%) | 13.1 | 11.8 | 13.9 | 11.8 | 25.5 | 11.5 | 26.0 | 24.8 | 22.9 |
| Molar ratio of monomers (TFE/VdF/8FVE) | 29/48/23 | 31/53/16 | 38/42/20 | 43/44/13 | 41/35/24 | 25/58/17 | 32/41/27 | 38/35/27 | 31/47/22 |
| Intrinsic viscosity (THF, 35° C.) | 0.92 | 0.81 | 0.85 | 1.00 | 1.03 | 0.62 | 1.03 | 0.92 | 2.17 |
| $T_g$ (°C.) | −17 | −21 | −17 | −15 | −14 | −22 | −16 | −14 | −18 |

Note:
*$^1$TFE: Tetrafluoroethylene.
VdF: Vinylidene fluoride.

EXAMPLE 5

In a 3.0 stainless steel made autoclave, ion-exchanged water (1.0 l), ammonium perfluorooctanoate (2.0 g), disodium hydrogen phosphate.dodecahydrate (5.0 g) and sodium sulfite (4.0 g) were charged. After closing the lid of autoclave and replacing the interior atmosphere with nitrogen three times, the autoclave interior space was evacuated. Then, the fluoroalkyl vinyl ether of the formula: $CH_2=CHOCH_2(CF_2)_2H$ (11 g) was added to the mixture, and the autoclave was pressurized with a mixture of tetrafluoroethylene and vinylidene fluoride to 8 kg/cm²G at 30° C. while stirring so as to keep the molar ratio of tetrafluoroethylene to vinylidene fluoride at 45:55. Then, a 10 wt % solution of ammonium persulfate in water (20 g) was injected to initiate polymerization. Immediately, the pressure began to drop. When the pressure dropped to 7 kg/cm²G, the pressure was recovered to 8 kg/cm²G with a mixture of tetrafluoroethylene and vinylidene fluoride of the molar ratio of 54:46. Then, the fluoroalkyl vinyl ether (5.5 g) was again added. The polymerization was continued for 84 minutes while adding the monomers when the pressure dropped. Thereafter, the polymerization was terminated by discharging the gas in the autoclave and quenching. A white aqueous dispersion having the solid content of 7.0% by weight (1085 g) was obtained.

The white aqueous dispersion was coagulated with potash alum, and the coagulated material was washed with water and dried to obtain a white copolymer (75 g). According to $^{19}F$-NMR and $^1H$-NMR analyses, the molar ratio of tetrafluoroethylene/vinylidene fluoride/-the fluoroalkyl vinyl ether was 31:16:53. The intrinsic viscosity was 0.87, and $T_g$ was +3° C.

EXPERIMENT EXAMPLE 2

The copolymer prepared in Example 24 (100 parts), medium thermal carbon (20 parts), magnesium oxide (3 parts), TAIC (5 parts) and $\alpha,\alpha'$-bis(tert.-butylperoxy-p-diisopropylbenzene) (1 part) were compounded, press cured at 170° C. under pressure of 35 kgf/cm² for 20 minutes and then oven cured at 230° C. for 24 hours to prepare a molded sheet. The original state properties of the sheet were as follows:

| | |
|---|---|
| 100% Tensile modulus ($M_{100}$) | 100 kgf/cm² |
| Tensile strength at break ($T_b$) | 184 kgf/cm² |
| Elongation at break ($E_b$) | 220% |
| Hardness (JIS, Hs) | 82 points |

To evaluate the oil resistance, the sheet was dipped in ASTM No. 3 oil or various motor oils at 175° C. for 70 hours. The results are shown in Table below.

For comparison, DAI-EL G-902 (100 parts), medium thermal carbon (20 parts), magnesium oxide (3 parts), TAIC (5 parts) and $\alpha,\alpha'$-bis(tert.-butylperoxy-p-diisopropylbenzene) (1 part) were compounded, press cured at 170° C. under pressure of 35 kgf/cm² for 20 minutes and then open cured at 230° C. for 24 hours to obtain a molded sheet. The original state properties of this sheet were as follows:

| | |
|---|---|
| 100% Tensile modulus ($M_{100}$) | 45 kgf/cm² |
| Tensile strength at break ($T_b$) | 250 kgf/cm² |
| Elongation at break ($E_b$) | 285% |
| Hardness (JIS, Hs) | 70 points |

With this sheet, the same oil resistance tests as above were carried out.

The results are shown in following Table.

| | Oil resistance | |
|---|---|---|
| | Example 24 | DAI-EL G-902 |
| ASTM No. 3 oil | | |
| $\Delta T_b$ (%) | −10 | −25 |
| $\Delta E_b$ (%) | +1 | −8 |
| $\Delta H_s$ (%) | −1 | 0 |
| $\Delta V$ (%) | +2.6 | +1.8 |
| Shell SG class (Formula × 5W-30) | | |
| $\Delta T_b$ (%) | −8 | −49 |
| $\Delta E_b$ (%) | −17 | −32 |
| $\Delta H_s$ (%) | +1 | 0 |
| $\Delta V$ (%) | +1.5 | +1.0 |
| Toyota SF class (Clean Excellent 10W-40) | | |
| $T_b$ (%) | −36 | −48 |
| $\Delta E_b$ (%) | −38 | −32 |
| $\Delta H_s$ (%) | +2 | +3 |
| $V$ (%) | +1.7 | +0.8 |
| Nissan SF class (Extrasave 7.5W-30) | | |
| $T_b$ (%) | −7 | −44 |
| $\Delta E_b$ (%) | +1 | −24 |
| $\Delta H_s$ (%) | +1 | +2 |
| $\Delta V$ (%) | +1.2 | +0.7 |

The same sheets were subjected to the aging in the air. The results are shown in the following Table.

| | Aging in the air | | | | | | | |
|---|---|---|---|---|---|---|---|---|
| | Example 24 | | | | DAI-EL G-902 | | | |
| Exposure temp. (°C.) | 230 | | 250 | | 230 | | 250 | |
| Exposure time (hrs) | 70 | 168 | 70 | 168 | 70 | 168 | 70 | 168 |
| $\Delta T_b$ (%) | −4 | −33 | −32 | −48 | −23 | −51 | −67 | −83 |
| $\Delta E_b$ (%) | +29 | +12 | −1 | −7 | +15 | +43 | +78 | +187 |
| $\Delta H_s$ (%) | 0 | 0 | +1 | −1 | +1 | 0 | 0 | 0 |

EXAMPLE 26

In a 200 ml stainless steel made autoclave, the fluoroalkyl vinyl ether of the formula: $CH_2=CHOCH_2(CF_2)_2H$ (32.7 g) and R-113 (40 ml) were charged. After cooling the mixture on a dry-ice-/acetone bath, a solution of 2,4,5-trichloro-perfluorohexanoylperoxide in R-113 a concentration of which was 0.3 g/ml (1.5 ml) was added to the autoclave followed by replacement with nitrogen. Then, tetrafluoroethylene (61.4 g) and ethylene (7.2 g) were added to the , mixture, and the monomers were reacted at 20° C. for 1 (one) hour while shaking. As the reaction proceeded, the pressure in the autoclave dropped from 21.4 kg/cm²G to 20.8 kg/cm²G. Then, the unreacted monomers were discharged, and the solvent and the monomers were removed by heating and evacuation to obtain a non-crystalline copolymer (11.8 g). According to $^{19}F$-NMR and $^1H$-NMR analyses, the molar ratio of ethylene/tetrafluoroethylene/the fluoroalkyl vinyl ether was 36:40:24. $T_g$ was −19° C.

EXAMPLES 27–39

In the same manner as in Example 26 but charging the monomers in the amounts specified in Table 3, the polymerization was carried out. The compositions and properties of the polymer are shown in Table 3.

TABLE 3

| Example No. | Charged amounts E/TFE/4FVE[1] (g/g/g) | Molar ratio of monomers (moles) E/TFE/4FVE | $T_g$ (°C.) | Resistance to solvent or amine[2] |
|---|---|---|---|---|
| 26 | 7.2/61.4/32.7 | 36/40/24 | −19 | Acetone (D), toluene & chloroform (C) methanol (B), dimethylamine (A) |
| 27 | 19.8/49.2/37.3 | 36/30/34 | +7 | Acetone (D), toluene & chloroform (C) methanol (B), dimethylamine (A) |
| 28 | 28.0/23.6/41.1 | 44/40/16 | −1 | |
| 29 | 6.4/32.3/63.3 | 29/39/32 | −43 | |
| 30 | 12.9/11.6/75.9 | 39/11/30 | −51 | |
| 31 | 8.6/82.0/9.2 | 28/52/20 | +31 | Acetone (D), benzine (B), methanol, toluene, chloroform, isopropanol & dimethylamine (A) |
| 32 | 8.3/42.8/47.8 | 20/46/34 | −9 | |
| 33 | 3.7/49.2/48.7 | 11/47/42 | −3 | |
| 34 | 3.5/76.6/23.3 | 18/51/31 | +4 | |
| 35 | 13.4/66.2/20.5 | 34/46/20 | +25 | |
| 36 | 20.5/33.7/44.7 | 40/40/20 | −13 | |
| 37 | 9.2/23.1/70.4 | 18/39/43 | −4 | |
| 38 | 11.6/24.9/46.1 | 33/39/28 | −20 | |
| 39 | 12.0/44.0/43.5 | 31/44/25 | −13 | |

Note:
[1] E: ethylene, TFE: tetrafluoroethylene, 4FVE: $CH_2 = CHOCH_2(CF_2)_2H$.
[2] Dipped in a solvent or an amine 24 hours. A: No change, B: discolored, C: swelled (cracked), D: dissolved.

EXAMPLE 40

In a 3.0 l stainless steel made autoclave, ion-exchanged water (1.0 l), ammonium perfluorooctanoate (2.0 g), disodium hydrogen phosphate.dodecahydrate (5.0 g) and sodium sulfite (1.0 g) were charged. After closing the lid of autoclave and replacing the interior atmosphere with nitrogen three times, the autoclave interior space was evacuated. Then, the fluoroalkyl vinyl ether of the formula: $CH_2=CHOCH_2(CF_2)_2H$ (300 g) was added to the mixture, and the autoclave was pressurized with a mixture of tetrafluoroethylene and ethylene to 21 kg/cm$^2$G at 15° C. while stirring so as to keep the molar ratio of tetrafluoroethylene to ethylene at 49:51. Then, a 10 wt % solution of ammonium persulfate in water (5.0 g) was injected to initiate polymerization. Immediately, the pressure began to drop. When the pressure dropped to 20 kg/cm$^2$G, the pressure was recovered to 21 kg/cm$^2$G with a mixture of tetrafluoroethylene and ethylene of the molar ratio of 47:53. The polymerization was continued for 5.4 hours while adding the monomers when the pressure dropped. Thereafter, the polymerization was terminated by discharging the gas in the autoclave and quenching. A white aqueous dispersion having the solid content of 19.0% by weight was obtained.

The white aqueous dispersion was coagulated with potash alum, and the coagulated material was washed with water and dried to obtain a white copolymer. According to $^{19}$F-NMR and $^1$H-NMR analyses, the molar ratio of tetrafluoroethylene/ethylene/the fluoroalkyl vinyl ether was 40:22:38. The intrinsic viscosity was 0.83, and $T_g$ was +7.5° C.

EXPERIMENT EXAMPLE 3

The copolymer prepared in Example 40 (100 parts), medium thermal carbon (20 parts), calcium hydroxide (10 parts), TAIC (5 parts) and tert.-butyl peroxybenzoate (4 parts) were compounded, press cured at 150° C. under pressure of 35 kgf/cm$^2$ for 10 minutes and then oven cured at 160° C. for 4 hours to prepare a molded sheet. Then, resistance to amine and oil was examined with the prepared sheet.

For comparison, DAI-EL G-902 (100 parts), medium thermal carbon (20 parts), TAIC (4 parts) and 2,5-dimethyl-2,5-di(tert.-butylperoxy)hexane (1.5 parts) were compounded, press cured at 160° C. under pressure of 35 kgf/cm$^2$ for 10 minutes and then oven cured at 180° C. for 4 hours to obtain a molded sheet, which was subjected to the same tests as above.

The results are shown in the following Table.

| | Resistance to amines and oil | | | |
|---|---|---|---|---|
| | Example 40 | | DAI-EL G-902 | |
| Amine or oil (Dip conditions) | Volume change | Appearance | Volume change | Appearance |
| Ethylene diamine (30° C. × 30 min.) | 13.0% | No change | 6.0% | Cracks at folding |
| DBU[1] (30° C. × 2 hrs.) | 11.0% | No change | 2.6% | Cracks at folding |
| ASTM No. 3 oil (175° C. × 95 hrs.) | 11.8% | — | 9.9% | — |

Note:
[1] DBU = 1,8-diazabicyclo[5.4.0]undecene-7.

EXAMPLES 41–44

In the same manner as in Example 40 but employing the conditions specified in Table 4, the polymerization was carried out to obtain a copolymer. The monomer composition and properties of the copolymer are shown in Table 4.

TABLE 4

| Example | 40 | 41 | 42 | 43 | 44 |
|---|---|---|---|---|---|
| Initial charge | | | | | |
| Ion-exchanged water (l) | 1.0 | 1.0 | 1.0 | 1.0 | 1.0 |
| Ammonium perfluorooctanoate (g) | 2.0 | 2.0 | 2.0 | 2.0 | 2.0 |
| Disodium hydrogen phosphate (g) | 5.0 | — | — | 5.0 | 5.0 |

TABLE 4-continued

| Example | 40 | 41 | 42 | 43 | 44 |
|---|---|---|---|---|---|
| Sodium sulfite (g) | 1.0 | —[1] | 2.0 | 1.0 | 1.0 |
| Ammonium persulfate (g) | 0.5 | 1.5 | 1.0 | 1.0 | 1.0 |
| $CH_2=CHOCH_2(CF_2)_4H$ (4FVE) (g) | 300 | 300 | 300 | 300 | 300 |
| Monomer mixture in interior TFE/ethylene (molar ratio) | 47/53 | 52/48 | 55/45 | 49/51 | 27/73 |
| Ion-exchanged water (l) TFE/ethylene (molar ratio) | 46/54 | 56/44 | 56/44 | 50/50 | 46/54 |
| Reaction time (hrs.) | 5.4 | 5.2 | 7.4 | 3.0 | 12.0 |
| Solid content of dispersion (%) | 24.0 | 22.7 | 24.5 | 23.7 | 21.3 |
| Molar ratio of monomers (TFE/ethylene/4FVE) | 40/22/38 | 30/14/56 | 36/14/50 | 37/21/42 | 32/23/45 |
| Intrinsic viscosity (THF, 35° C.) | 0.83 | 0.18 | — | 0.03 | 0.49 |
| $T_g$ (°C.) | +8 | −2 | +4 | +5 | +3 |

Note:
[1]Polymerization temperature: 80° C. Non-redox system.

EXAMPLE 45

In a 3.0 stainless steel made autoclave, ion-exchanged water (1.0 l), ammonium perfluorooctanoate (2.0 g), disodium hydrogen phosphate.dodecahydrate (5.0 g), sodium sulfite (1.0 g) and the fluoroalkyl vinyl ether of the formula: $CH_2=CHOCH_2(CF_2)_4H$ (40 g) were charged. After closing the lid of autoclave and replacing the interior atmosphere with nitrogen three times, the autoclave was pressurized with a mixture of tetrafluoroethylene and etylene to 21 kg/cm²G at 30° C. while stirring so as to keep the molar ratio of tetrafluoroethylene to ethylene at 31:69. Then, a 10 wt % solution of ammonium persulfate in water (15 g) was injected to initiate polymerization. Immediately, the pressure began to drop. When the pressure dropped to 20 kg/cm²G, the pressure was recovered to 21 kg/cm²G by injecting the fluorovinyl ether with a mixture of tetrafluoroethylene and ethylene of the molar ratio of 74:26. The polymerization was continued for 6.6 hours while adding the monomers when the pressure dropped. Thereafter, the polymerization was terminated by discharging the gas in the autoclave and quenching. A white aqueous dispersion having the solid content of 16.1% by weight was obtained.

The white aqueous dispersion was coagulated with potash alum, and the coagulated material was washed with water and dried to obtain a white copolymer. According to $^{19}F$-NMR and $^1H$-NMR analyses, the molar ratio of tetrafluoroethylene/ethylene/the fluoroalkyl vinyl ether was 40:25:35. The intrinsic viscosity was 0.37, and $T_g$ was −13.3° C.

EXAMPLES 46-48

In the same manner as in Example 45 but employing the conditions specified in Table 5, the polymerization was carried out to obtain the copolymer. The monomer composition and properties of the copolymer are shown in Table 5.

| Example No. | 45 | 46 | 47 | 48 |
|---|---|---|---|---|
| Initial charge | | | | |
| Ion-exchanged water (l) | 1.0 | 1.0 | 1.0 | 1.0 |
| Ammonium perfluorooctanoate (g) | 2.0 | 2.0 | 2.0 | 2.0 |
| Disodium hydrogen phosphate (g) | 5.0 | 5.0 | 5.0 | 5.0 |
| Sodium sulfite (g) | 2.0 | 1.0 | 3.0 | 2.0 |
| Ammonium persulfate (g) | 1.5 | 0.8 | 1.8 | 2.6 |
| $CH_2=CHOCH_2(CF_2)_4H$ (8FVE) (g) | 40 | 40 | 20 | 40 |
| Monomer mixture in interior TFE/ethylene (molor ratio) | 31/69 | 38/62 | 37/63 | 19/81 |
| Additional monomers | | | | |
| TFE/ethylene (molar ratio) | 74/26 | 54/46 | 56/44 | 30/70 |
| 8FVE[1] | 20 | 20 | 10 | 20 |
| Reaction time (hrs.) | 6.6 | 4.5 | 3.9 | 4.8 |
| Solid content of dispersion (%) | 16.1 | 10.4 | 8.8 | 6.7 |
| Molar ratio of monomers (TFE/ethylene/8FVE) | 40/25/35 | 40/23/37 | 39/37/24 | 33/31/36 |
| Intrinsic viscosity (THF, 35° C.) | 0.37 | 0.314 | 0.319 | 0.143 |
| $T_g$ (°C.) | −13 | −14 | −6 | −33 |

Note
[1]The amount of 8FVE charged when the pressure dropped by 1 kg/cm²G.

EXPERIMENT EXAMPLE 4

The copolymer prepared in Example 47 (100 parts), magnesium oxide (30 parts), TAIC (4 parts) and benzoyl peroxide (3.5 parts) were compounded, press cured at 120° C. under pressure of 35 kgf/cm² for 50 minutes and then oven cured at 120° C. for 4 hours to prepare a molded sheet. Then, resistance to amine and oil was examined with the prepared sheet.

For comparison, DAI-EL G-902 (100 parts), medium thermal carbon (20 parts), TAIC (4 parts) and 2,5-dimethyl-2,5-di(tert.-butylperoxy)hexane (1.5 parts) were compounded, press cured at 160° C. under pressure of 35 kgf/cm² for 10 minutes and then oven cured at 180° C. for 4 hours to obtain a molded sheet, which were subjected to the same tests as above.

The results are shown in the following Table.

| | Resistance to amines and oil | | | |
|---|---|---|---|---|
| | Example 47 | | DAI-EL G-902 | |
| Amine or oil (Dip conditions) | Volume change | Appearance | Volume change | Appearance |
| Ethylene diamine (30° C. × 30 min.) | 1.9% | No change | 6.0% | Cracks at folding |
| DBU*1 (30° C. × 2 hrs.) | 1.9% | No change | 2.6% | Cracks at folding |
| ASTM No. 3 oil (175° C. × 95 hrs.) | 4.4% | — | 9.9% | — |

Note:
*1DBU = 1,8-diazabicyclo[5.4.0]undecene-7.

What is claimed is:

1. A fluorine-containing non-crystalline copolymer comprising 10 to 90% by mole of repeating units derived from tetrafluoroethylene and 90 to 10% by mole of repeating units derived from a fluorovinyl ether of the formula:

$$CH_2=CHOCH_2(CF_2)_nX \qquad (I)$$

wherein X is a halogen atom or a hydrogen atom and n is a number of 2 to 8.

2. The copolymer according to claim 1, wherein the content of repeating units derived from tetrafluoroethylene is from 35 to 65% by mole, and that of repeating units derived from the fluorovinyl ether (I) is from 65 to 35% by mole.

3. The copolymer according to claim 1, wherein the fluorovinyl ether (I) is one selected from the group consisting of $CH_2=CHOCH_2(CF_2)_2H$, $CH_2=CHOCH_2(CF_2)_4H$, $CH_2=CHOCH_2(CF_2)_6H$, $CH_2=CHOCH_2(CF_2)_8H$, $CH_2=CHOCH_2(CF_2)_2F$, $CH_2=CHOCH_2(CF_2)_4F$, $CH_2=CHOCH_2(CF_2)_6F$, $CH_2=CHOCH_2(CF_2)_8F$, $CH_2=CHOCH_2(CF_2)_2Cl$, $CH_2=CHOCH_2(CF_2)_4Cl$, $CH_2=CHOCH_2(CF_2)_6Cl$ and $CH_2=CHOCH_2(CF_2)_8Cl$.

4. A copolymer comprising repeating units derived from tetrafluoroethylene, a fluorovinyl ether of the formula:

$$CH_2=CHOCH_2(CF_2)_nX \qquad (I)$$

wherein X is a halogen atom or a hydrogen atom and n is a number of 2 to 8 and a third monomer selected from the group consisting of vinylidene fluoride and ethylene in which the content of repeating units derived from the third monomer is from 1 to 80% by mole in case of vinylidene fluoride or from 10 to 60% by mole in case of ethylene, and the remain consists of the repeating unites derived from tetrafluoroethylene and the fluorovinyl ether (I) in a molar ratio of 1:9 to 9:1.

5. The copolymer according to claim 4, wherein the third monomer is vinylidene fluoride, and contents of terafluoroethylene, the fluorovinyl ether (I) and vinylidene fluoride are 15 to 50% by mole, 10 to 50% by mole and 5 to 60% by mole, respectively.

6. The copolymer according to claim 4, wherein the third monomer is ethylene, and contents of terafluoroethylene, the fluorovinyl ether and ethylene are 10 to 50% by mole, 15 to 60% by mole and 10 to 50% by mole, respectively.

7. The copolymer according to claim 4, wherein the fluorovinyl ether (I) is one selected from the group consisting of $CH_2=CHOCH_2(CF_2)_2H$, $CH_2=CHOCH_2(CF_2)_4H$, $CH_2=CHOCH_2(CF_2)_6H$, $CH_2=CHOCH_2(CF_2)_8H$, $CH_2=CHOCH_2(CF_2)_2F$, $CH_2=CHOCH_2(CF_2)_4F$, $CH_2=CHOCH_2(CF_2)_6F$, $CH_2=CHOCH_2(CF_2)_8F$, $CH_2=CHOCH_2(CF_2)_2Cl$, $CH_2=CHOCH_2(CF_2)_4Cl$, $CH_2=CHOCH_2(CF_2)_6Cl$ and $CH_2=CHOCH_2(CF_2)_8Cl$.

* * * * *